US012606260B2

(12) United States Patent
Homec et al.

(10) Patent No.: US 12,606,260 B2
(45) Date of Patent: *Apr. 21, 2026

(54) ANGULAR RUB RAILS FOR TRAILERS

(71) Applicant: HYUNDAI TRANSLEAD, San Diego, CA (US)

(72) Inventors: Laura Homec, San Diego, CA (US); Loc Quoc Bui, San Diego, CA (US); Weilun Chang, San Diego, CA (US); Jimmy Minh Nguyen, San Diego, CA (US)

(73) Assignee: HYUNDAI TRANSLEAD, San Diego, CA (US)

( * ) Notice: Subject to any disclaimer, the term of this patent is extended or adjusted under 35 U.S.C. 154(b) by 372 days.

This patent is subject to a terminal disclaimer.

(21) Appl. No.: 18/212,655

(22) Filed: Jun. 21, 2023

(65) Prior Publication Data

US 2023/0331324 A1     Oct. 19, 2023

Related U.S. Application Data

(63) Continuation-in-part of application No. 18/140,989, filed on Apr. 28, 2023, now Pat. No. 11,932,335, (Continued)

(51) Int. Cl.
*B62D 25/20* (2006.01)
*B62D 21/20* (2006.01)
*B62D 63/08* (2006.01)

(52) U.S. Cl.
CPC ......... *B62D 63/08* (2013.01); *B62D 25/2054* (2013.01); *B62D 21/20* (2013.01)

(58) Field of Classification Search
CPC .... B62D 21/20; B62D 25/2054; B62D 33/02; B62D 53/061; B62D 63/08; B60P 7/0815
(Continued)

(56) References Cited

U.S. PATENT DOCUMENTS 2,447,471 A     8/1948   Wagner
2,639,187 A     5/1953   Grumbache
(Continued)

FOREIGN PATENT DOCUMENTS

MX        2022006096 A        1/2023

OTHER PUBLICATIONS

Fontaine Infinity Operator's Manual, 2020, Fontaine Commercial Platform, Haleyville, AL, USA.

*Primary Examiner* — Gregory A Blankenship
(74) *Attorney, Agent, or Firm* — Knobbe, Martens, Olson & Bear, LLP

(57) ABSTRACT

A side rail assembly for a flatbed trailer extruded together as one integrated piece, including: a top extension face; a top chamfer; a side vertical face; a top horizontal face diagonally coupled to the side vertical face by the top chamfer, the top horizontal face to step down into the top extension face, wherein the top extension face extends to provide a surface to attach floor boards to the side rail assembly; an inner vertical face; a bottom extension face; an extended flange coupled to the bottom extension face; a bottom chamfer; and a bottom horizontal face diagonally coupled to the side vertical face by the bottom chamfer, the bottom horizontal face also couples to the bottom extension face, wherein the bottom horizontal face extends to the extended flange to provide an ability to use flat hooks for cargo securement.

8 Claims, 13 Drawing Sheets

Related U.S. Application Data which is a continuation of application No. 17/368,649, filed on Jul. 6, 2021, now Pat. No. 11,702,164.

(58) Field of Classification Search
USPC ...................... 296/184.1; D12/101, 106, 159
See application file for complete search history.

(56) References Cited

U.S. PATENT DOCUMENTS

| | | | |
|---|---|---|---|
| 3,102,646 | A | 9/1963 | Clejan |
| 3,125,354 | A | 3/1964 | Connerat |
| 3,185,519 | A | 5/1965 | Turnbull et al. |
| 3,252,730 | A | 5/1966 | Chieger et al. |
| 3,266,837 | A | 8/1966 | Stricker, Jr. et al. |
| 3,380,216 | A | 4/1968 | Spence |
| 3,620,505 | A | 11/1971 | Murdock |
| 3,623,642 | A | 11/1971 | Stephen |
| 3,633,937 | A | 1/1972 | Hlinsky |
| 3,705,732 | A | 12/1972 | Marinelli |
| 3,794,375 | A | 2/1974 | Woodward |
| 4,067,601 | A | 1/1978 | Tuerk |
| 4,083,592 | A | 4/1978 | Rubin et al. |
| 4,167,273 | A | 9/1979 | Hrasche |
| 4,226,465 | A | 10/1980 | Mccullough |
| 4,236,748 | A | 12/1980 | Cloutier et al. |
| 4,302,044 | A | 11/1981 | Sims |
| 4,342,480 | A | 8/1982 | Ross, Jr. |
| 4,416,484 | A | 11/1983 | O'Neil |
| 4,564,233 | A | 1/1986 | Booher |
| 4,626,022 | A | 12/1986 | Booher |
| 4,671,562 | A | 6/1987 | Broadbent |
| 4,789,197 | A | 12/1988 | Lewis |
| 5,224,321 | A | 7/1993 | Fearn |
| 5,320,396 | A | 6/1994 | Petelka |
| 5,338,084 | A | 8/1994 | Wardell |
| 5,351,990 | A | 10/1994 | Thomas |
| 5,415,505 | A | 5/1995 | Halpin et al. |
| 5,476,348 | A | 12/1995 | Shelleby |
| 5,526,622 | A | 6/1996 | Augustine |
| 5,628,596 | A | 5/1997 | Halpin et al. |
| 5,788,437 | A | 8/1998 | Kalis, Jr. |
| 5,860,777 | A | 1/1999 | Walsh et al. |
| 5,888,040 | A | 3/1999 | Walsh et al. |
| 5,890,757 | A | 4/1999 | Masterson et al. |
| 6,065,796 | A | 5/2000 | Verduyn |
| 6,250,861 | B1 | 6/2001 | Whitehead |
| 6,513,297 | B2 | 2/2003 | Kloepfer |
| 6,527,487 | B2 | 3/2003 | Adams |
| 6,626,623 | B2 | 9/2003 | DeLay |
| 6,709,208 | B1 | 3/2004 | Lyrstrand et al. |
| 6,733,219 | B1 | 5/2004 | Gloe |
| 6,871,904 | B2 | 3/2005 | Bhat et al. |
| 6,893,076 | B1 | 5/2005 | Lewis |
| 6,918,721 | B2 | 7/2005 | Venton-Walters et al. |
| 6,939,095 | B1 | 9/2005 | Hugg |
| 7,090,449 | B1 | 8/2006 | Hugg |
| 7,172,378 | B1 | 2/2007 | Cerullo et al. |
| 7,267,393 | B2 | 9/2007 | Booher |
| 7,344,178 | B2 | 3/2008 | Lowry et al. |
| 7,401,844 | B2 | 7/2008 | Lemmons |
| 7,458,758 | B2 | 12/2008 | Adams |
| 7,568,754 | B2 * | 8/2009 | Adams ............... B62D 25/2054<br>296/184.1 |
| 7,735,891 | B2 | 6/2010 | Goode |
| 7,896,427 | B2 | 3/2011 | Adams |
| 8,439,427 | B2 | 5/2013 | Adams |
| 10,155,544 | B2 * | 12/2018 | Booher .................. B62D 21/20 |
| 11,459,045 | B1 * | 10/2022 | Hensiek ................ B62D 33/02 |
| 11,702,164 | B2 * | 7/2023 | Homec .............. B62D 25/2054<br>296/41 |
| 11,932,335 | B2 * | 3/2024 | Homec .................. B62D 63/08 |
| 2002/0025237 | A1 | 2/2002 | Adams |
| 2006/0071506 | A1 | 4/2006 | Adams |
| 2007/0007759 | A1 | 1/2007 | Lemmons |
| 2009/0028658 | A1 | 1/2009 | Adams |
| 2009/0273204 | A1 | 11/2009 | Adams |
| 2013/0036960 | A1 | 2/2013 | Berman et al. |
| 2016/0207439 | A1 | 7/2016 | Hancock |
| 2017/0008581 | A1 * | 1/2017 | Booher .................. B62D 21/20 |
| 2018/0272847 | A1 | 9/2018 | Beshiri |
| 2019/0047637 | A1 | 2/2019 | DeMonte |
| 2022/0144159 | A1 * | 5/2022 | Smith ............... B62D 25/2054 |
| 2022/0289306 | A1 | 9/2022 | Thomas |
| 2023/0009915 | A1 | 1/2023 | Homec |
| 2023/0264768 | A1 | 8/2023 | Homec et al. |
| 2023/0331324 | A1 * | 10/2023 | Homec ................. B60P 7/0815 |

\* cited by examiner

FIG. 11A                    FIG. 11B

Winch anchor

ANGULAR RUB RAILS FOR TRAILERS

CROSS-REFERENCE TO RELATED APPLICATIONS

The present application is a continuation-in-part application of co-pending U.S. patent application Ser. No. 18/140,989 (filed Apr. 28, 2023; entitled "Angular Rub Rails for Trailers"), which is a continuation application of co-pending U.S. patent application Ser. No. 17/368,649 (filed Jul. 6, 2021; entitled "Angular Rub Rails for Trailers"). The disclosures of the above-referenced patent applications are incorporated herein by reference.

BACKGROUND

Field of the Invention

The present disclosure relates generally to rub rails for trailers, and more specifically, to an angular rub rail and anchor points for the flatbed trailers.

Background

A flatbed trailer is designed to carry cargo tied down with various restraint devices including winches, ropes, straps, posts, chains, and other similar restraint devices. A strong support for connecting the restraint devices to the trailer is essential for safety of personnel and cargo. Commonly these devices are attached to the gaps between the side rail of a trailer and its rub rail. The side rail of a trailer is used to stabilize the floor assembly of a trailer, while the rub rail is designed to withstand side impacts from outside objects. Rub rail wear and tear is a common worry for cargo shippers. Denting and tearing of the rub rail are common sources of wear on flatbeds.

SUMMARY

The present disclosure describes an angular rub rail and anchor points for the flatbed trailers.

In one implementation, a side rail assembly for a flatbed trailer extruded together as one integrated piece is disclosed. The side rail assembly includes: a top extension face; a top chamfer; a side vertical face; a top horizontal face diagonally coupled to the side vertical face by the top chamfer, the top horizontal face to step down into the top extension face, wherein the top extension face extends to provide a surface to attach floor boards to the side rail assembly; an inner vertical face; a bottom extension face; an extended flange coupled to the bottom extension face; a bottom chamfer; and a bottom horizontal face diagonally coupled to the side vertical face by the bottom chamfer, the bottom horizontal face also couples to the bottom extension face, wherein the bottom horizontal face extends to the extended flange to provide an ability to use flat hooks for cargo securement.

Other features and advantages of the present disclosure should be apparent from the present description which illustrates, by way of example, aspects of the present disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

A flatbed trailer includes two main beams which extend from the front to the rear of the trailer body. Also, cross members are attached transverse to the two main beams at a spacing of 12" to 16" across the entirety of the trailer. Subsequently, the floor is laid on top of the cross members. The floor is often exposed to great forces of wear and tear during transport of cargo. To mitigate the stresses on the floor, side rails are attached to the outside edges of the cross members to provide stability to the cross members. The side rail is then protected with a railing called the "rub rail", which provides a cushion against side impacts on the trailer. Further, gaps between the side rail and the rub rail are used as space for cargo attachment devices.

As described above, wear and tear of the rub rail is a common problem for cargo shippers. The denting and tearing of the rub rail are common sources of wear on the flatbed trailers. Therefore, to address the issues involved with denting and tearing of the rub rail, certain implementations of the present disclosure provide for an angular rub rail and anchor points for the flatbed trailers. Accordingly, after reading this description it will become apparent how to implement the present disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

In one implementation, the rub rail of a side rail assembly of the flatbed trailer includes an angled corner extrusion cut with regular holes for the purpose of attaching restraint devices. Providing the cuts located within the area of the angled extrusion provides superior strength from side impacts, which often causes the significant damage to the rails of the trailer.

The present disclosure describes the improved strength design of the rub rail using angular corners. This improved strength design provides higher area moment of inertia than commonly found in the industry. The improved strength design also increases the strength of the rub rail from impacts in multiple different directions. The present disclosure also describes several different ways of attaching the improved rub rail design to the side rail.

Figure 1:
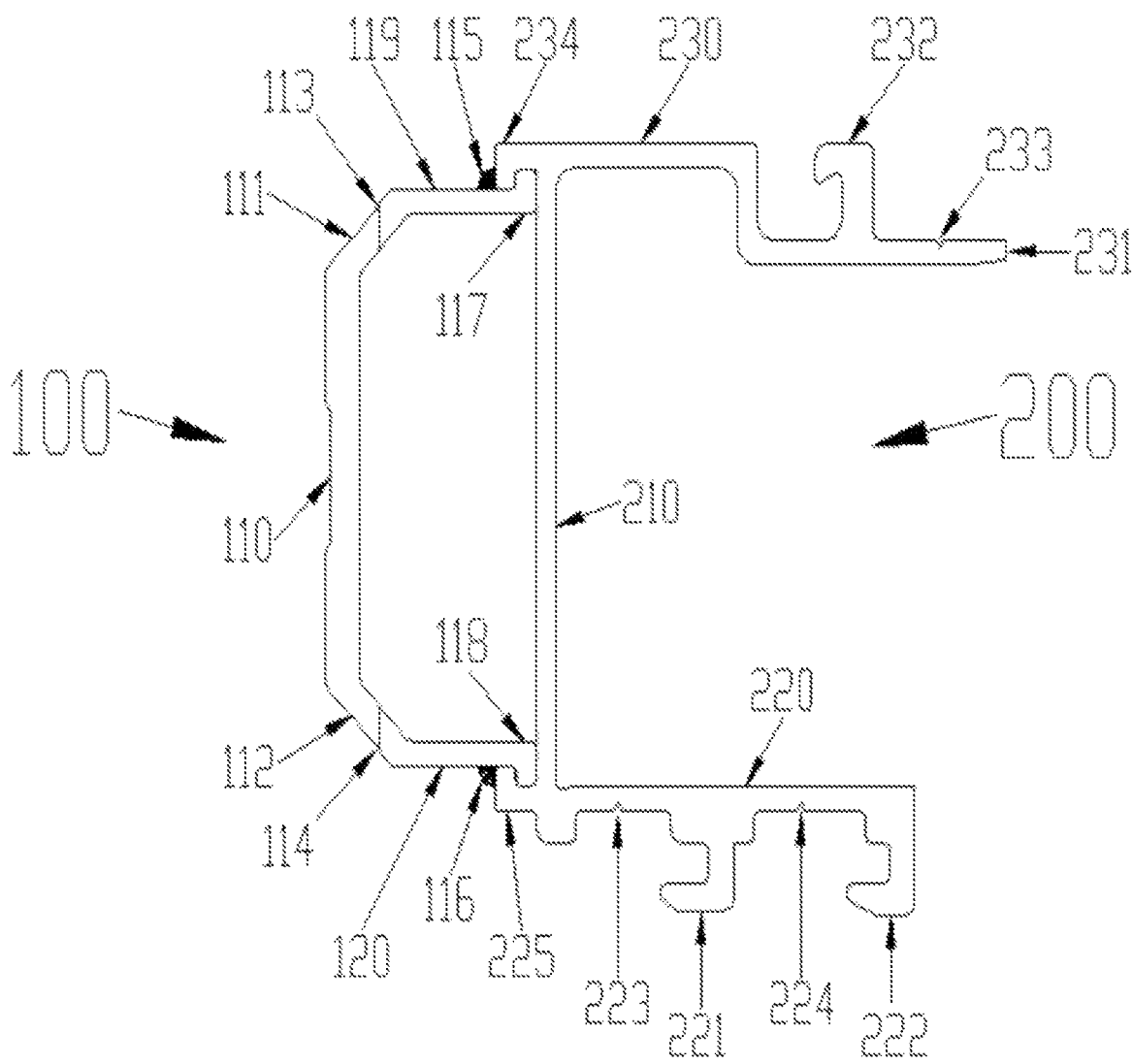
FIG. 1 is a side view of a rub rail coupled to a side rail in accordance with one implementation of the present disclosure.

FIG. 1 is a side view of a rub rail 100 coupled to a side rail 200 in accordance with one implementation of the present disclosure. The rub rail 100 and the side rail 200 runs the entire side of the trailer from front to rear. In one implementation, the rub rail 100 and the side rail 200 are formed with extruded aluminum.

In the illustrated implementation of FIG. 1, the side rail 200 is generally C-shaped and includes a top horizontal face 230, a side vertical face 210, and a bottom horizontal face 220. The top horizontal face 230 includes a hook 232 for attaching cargo securement devices and a downward step 231 for providing a surface to attach floor boards to the side rail 200. A notch 233 in the downward step 231 provides a mark for the location of the fasteners used to attach the floor boards to the side rail 200. The bottom horizontal face 220 includes double hooks 221, 222 for use by sliding winches and notches 223, 224 to mark the location of fasteners joining the cross members to the side rail.

In the illustrated implementation of FIG. 1, the rub rail 100 is generally C-shaped and includes a top horizontal face 119, a side vertical face 110, and a bottom horizontal face 120. The top horizontal face 119 is coupled to the side vertical face 110 by a top chamfer 111. The bottom horizontal face 120 is coupled to the side vertical face 110 by a bottom chamfer 112. Accordingly, in the illustrated implementation of FIG. 1, the rub rail includes five sides, which provide physical strength and damage-resistant characteristic.

In the illustrated implementation of FIG. 1, holes 113, 114 are cut in the top and bottom chamfers 111, 112, along the length of the rub rail 100. The holes 113, 114 provide locations to attach cargo restraint devices such as hooks, chains, straps, and posts. The top holes 113 are substantially aligned with the bottom holes 114. In one implementation, the top holes 113 start at the approximate center of the surface of the top chamfer 111 and run through the edge of the top horizontal face 119 of the rub rail 100. In one implementation, the bottom holes 114 start at the approximate center of the surface of the bottom chamfer 112 and run through the edge of the bottom horizontal face 120 of the rub rail 100. Starting the cut of the holes 113, 114 approximately half way through the top and bottom chamfers 111, 112 is important for maintaining the strength of the rub rail 100 by increasing the area moment of inertia of the vertical 110, top 119, and bottom 120 faces of the rub rail 100 in more directions. This increases the stiffness and strength of the design from impacts from the side, as well as from above and below.

Figure 2:
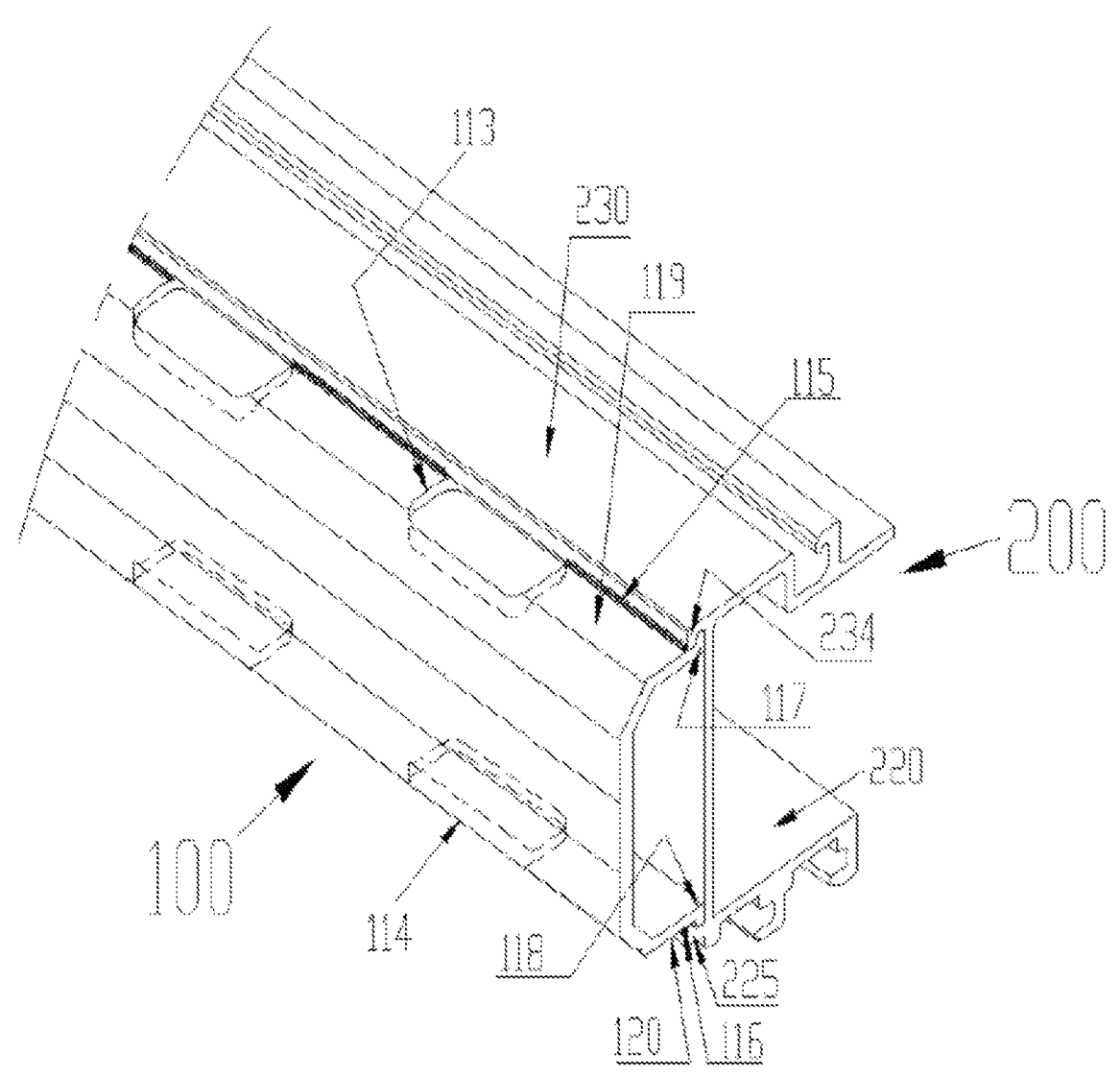
FIG. 2 is a top perspective view of the rub rail coupled to the side rail in accordance with one implementation of the present disclosure.

FIG. 2 is a top perspective view of the rub rail 100 coupled to the side rail 200 in accordance with one implementation of the present disclosure. In the illustrated implementation of FIG. 2, the side rail 200 includes a top notch 234 extruded as part of the top horizontal face 230 and a bottom notch 225 extruded as part of the bottom horizontal face 220. Further, the rub rail 100 includes a top notch 117 extending out of the top horizontal face 119 and a bottom notch 118 extending out of the bottom horizontal face 120. In the illustrated implementation of FIG. 2, the top notch 117 of the rub rail 100 is configured to slide under the top notch 234 of the side rail 200. The bottom notch 118 of the rub rail 100 is configured to slide on top of the bottom notch 225 of the side rail 200. Once the rub rail 100 and the side rail 200 are coupled together by sliding the notches 117, 118 of the rub rail 100 into the notches 234, 225 of the side rail 200, the rails 100, 200 can be joined together at joints 115, 116 by welding and/or soldering.

Figure 3:
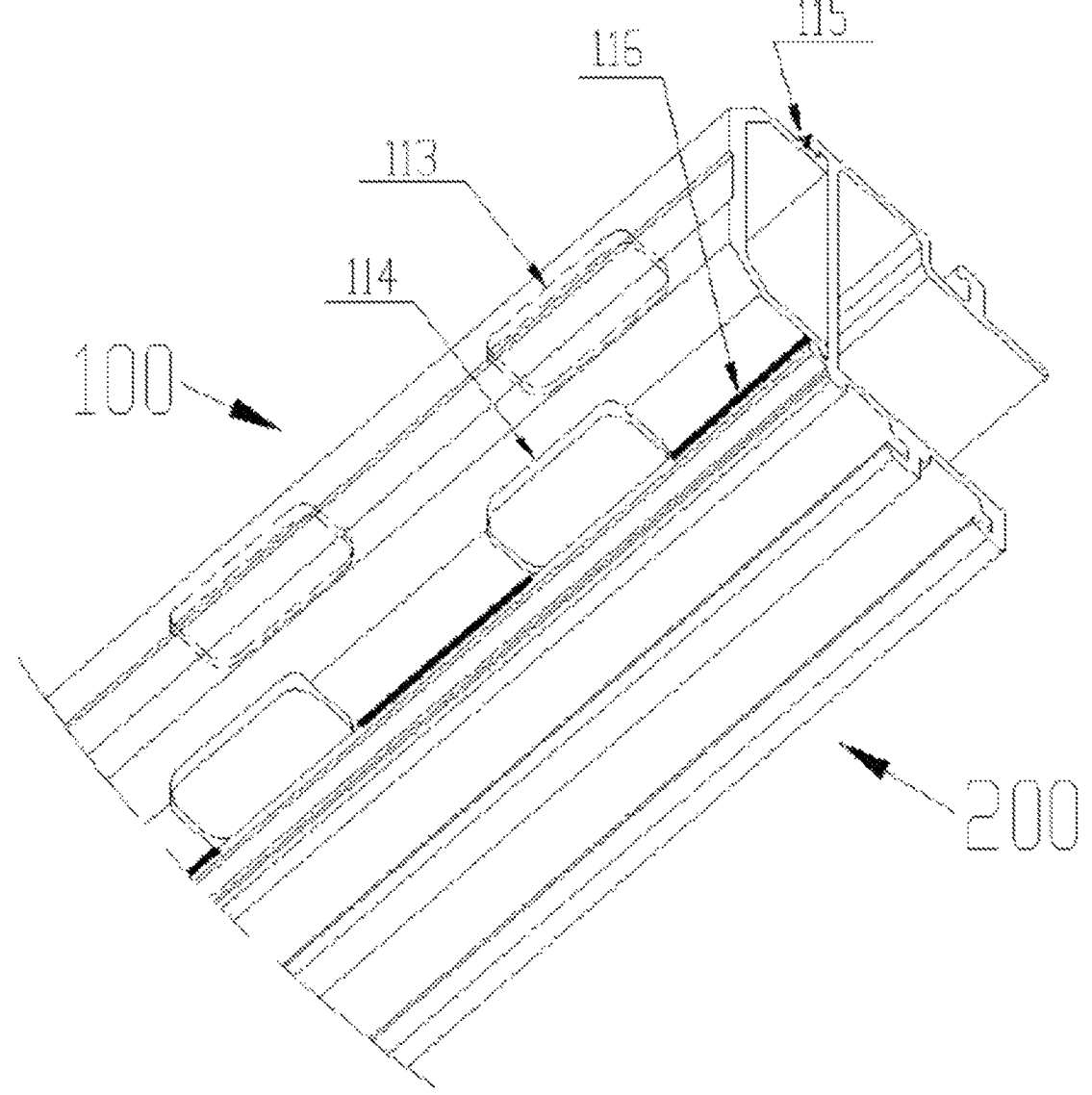
FIG. 3 is a bottom perspective view of the rub rail coupled to the side rail in accordance with one implementation of the present disclosure.

FIG. 3 is a bottom perspective view of the rub rail 100 coupled to the side rail 200 in accordance with one implementation of the present disclosure.

Figure 4:
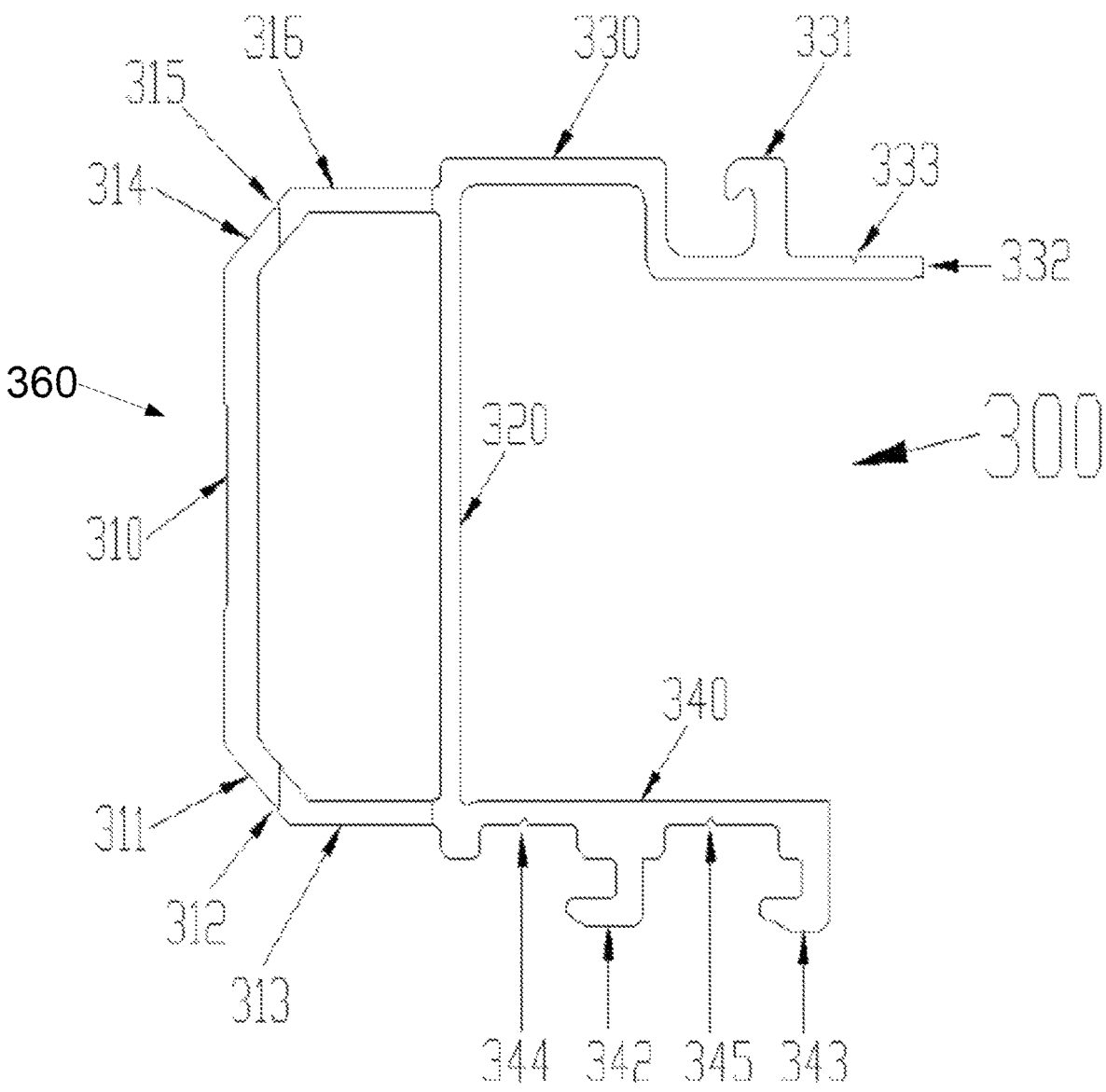
FIG. 4 is a side view a rub rail coupled to a side rail in accordance with another implementation of the present disclosure.

FIG. 4 is a side view a rub rail 360 coupled to a side rail 300 in accordance with another implementation of the present disclosure. The rub rail 360 and the side rail 300 runs the entire side of the trailer from front to rear. In one implementation, the rub rail 300 and the side rail 360 are formed with extruded aluminum.

In the illustrated implementation of FIG. 4, the side rail 300 is generally C-shaped and includes a top horizontal face 330, a side vertical face 320, and a bottom horizontal face 340. The top horizontal face 330 includes a hook 331 for attaching cargo securement devices and a downward step 332 for providing a surface to attach floor boards to the side rail 300. A notch 333 in the downward step 332 provides a mark for the location of the fasteners used to attach the floor boards to the side rail 300. The bottom horizontal face 340 includes double hooks 342, 343 for use by sliding winches and notches 344, 345 to mark the location of fasteners joining the cross members to the side rail.

In the illustrated implementation of FIG. 4, the rub rail 360 is generally C-shaped and includes a top horizontal face 316, a side vertical face 310, and a bottom horizontal face 313. The top horizontal face 316 is coupled to the side vertical face 310 by a top chamfer 314. The bottom horizontal face 313 is coupled to the side vertical face 310 by a bottom chamfer 311. Accordingly, in the illustrated implementation of FIG. 4, the rub rail 360 includes five sides, which provide physical strength and damage-resistant characteristic.

In the illustrated implementation of FIG. 4, holes 315, 312 are cut in the top and bottom chamfers 314, 311, along the length of the rub rail 360. The holes 315, 312 provide locations to attach cargo restraint devices such as hooks, chains, straps, and posts. The top holes 315 are substantially aligned with the bottom holes 312. In one implementation, the top holes 315 start at the approximate center of the surface of the top chamfer 314 and run through the edge of the top horizontal face 316 of the rub rail 360. In one implementation, the bottom holes 312 start at the approximate center of the surface of the bottom chamfer 311 and run through the edge of the bottom horizontal face 313 of the rub rail 360. Starting the cut of the holes 315, 312 approximately half way through the top and bottom chamfers 314, 311 is important for maintaining the strength of the rub rail 360 by increasing the area moment of inertia of the vertical 310, top 316, and bottom 313 faces of the rub rail 360 in more directions. This increases the stiffness and strength of the design from impacts from the side, as well as from above and below.

Figure 5:
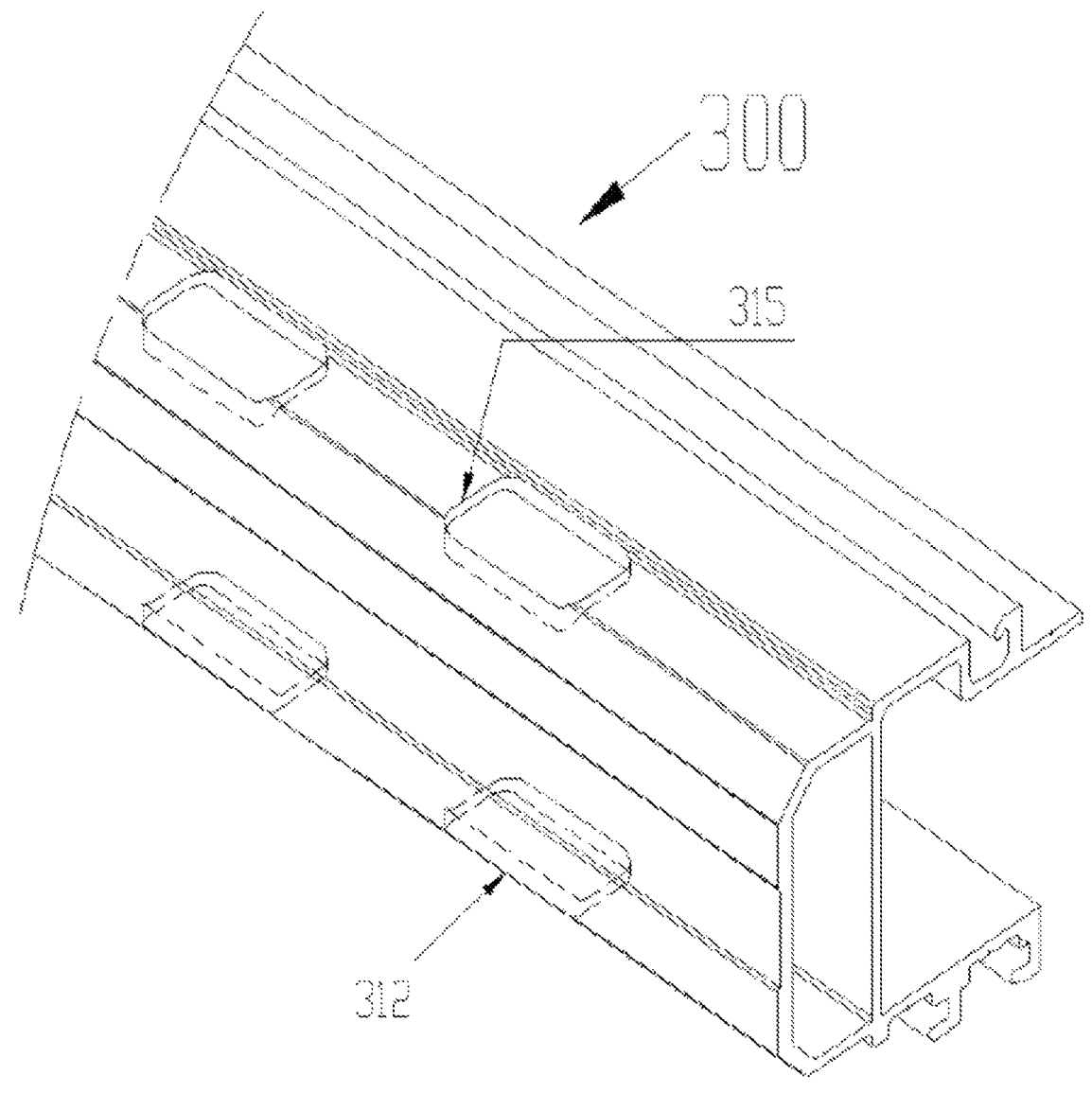
FIG. 5 is a top perspective view of the rub rail coupled to the side rail in accordance with another implementation of the present disclosure.

FIG. 5 is a top perspective view of the rub rail 360 coupled to the side rail 300 in accordance with another implementation of the present disclosure. In the illustrated implementation of FIG. 5, the rails 360, 300 are extruded together as one piece. In other implementations, the rails 360, 300 are joined together by welding and/or soldering without using notches.

Figure 6:
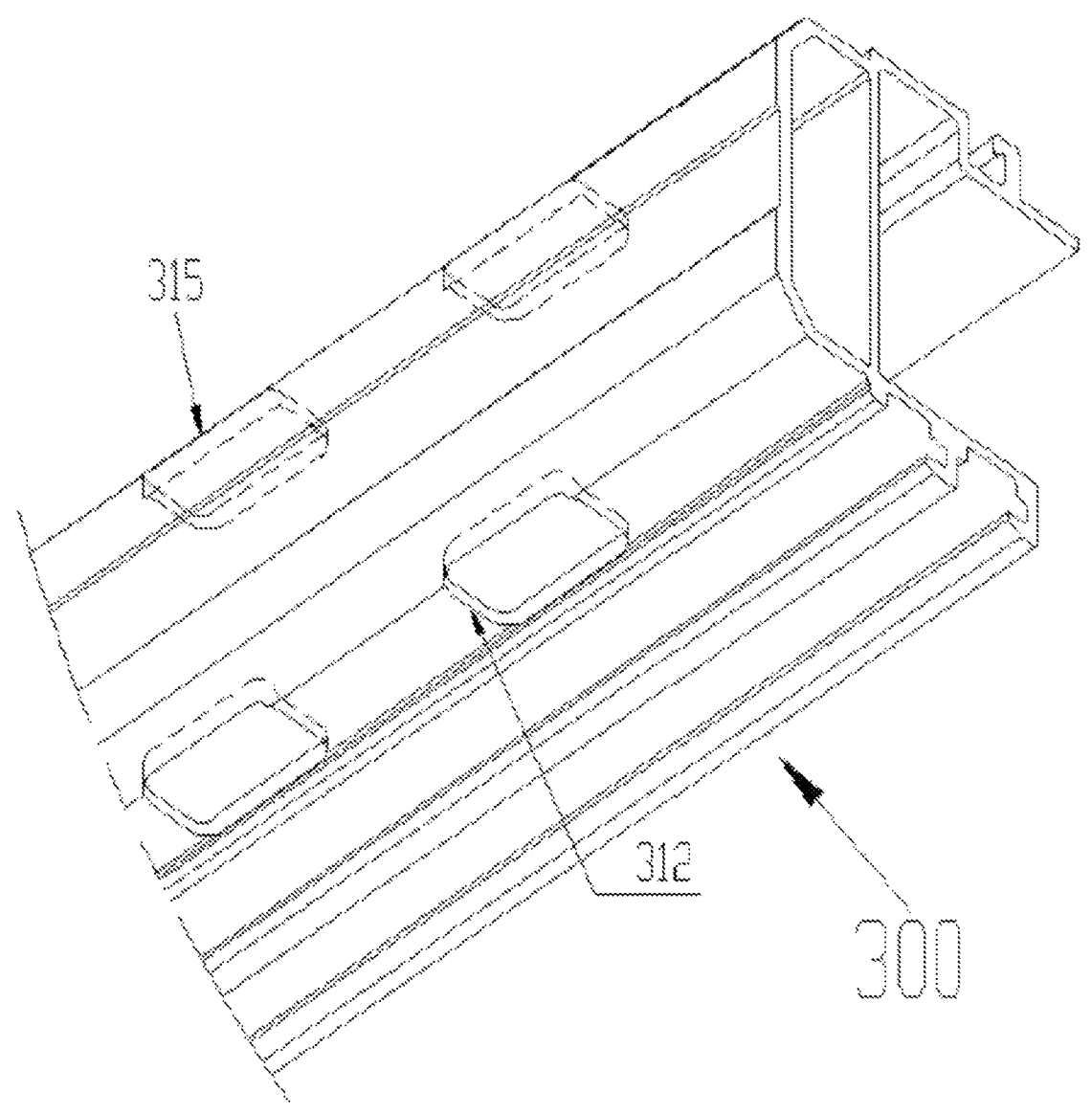
FIG. 6 is a bottom perspective view of the rub rail coupled to the side rail in accordance with another implementation of the present disclosure.

FIG. 6 is a bottom perspective view of the rub rail 360 coupled to the side rail 300 in accordance with another implementation of the present disclosure. FIG. 6 also shows the holes 315, 312.

Figure 7:
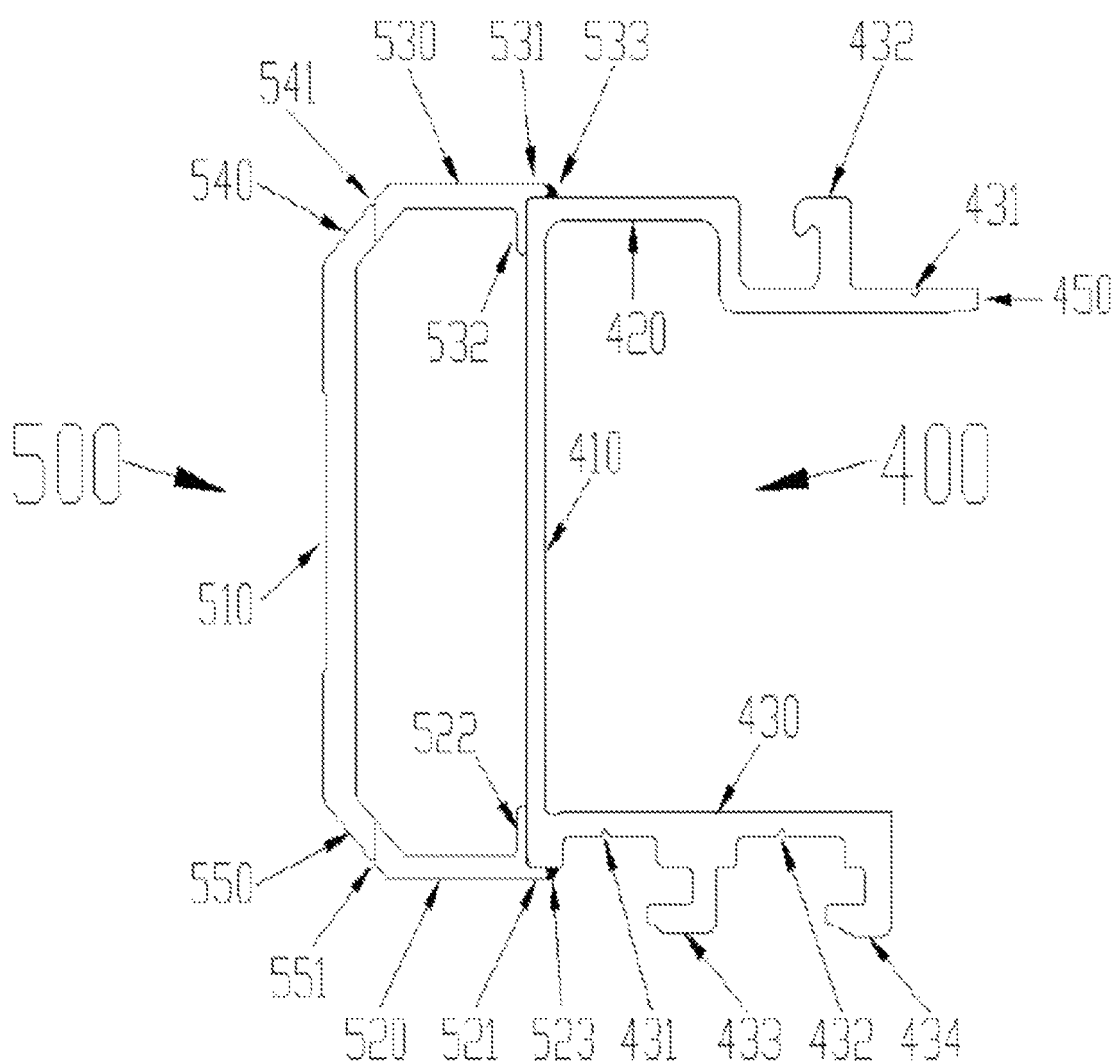
FIG. 7 is a side view a rub rail coupled to a side rail in accordance with further implementation of the present disclosure.

FIG. 7 is a side view a rub rail 500 coupled to a side rail 400 in accordance with further implementation of the present disclosure. The rub rail 500 and the side rail 400 runs the entire side of the trailer from front to rear. In one implementation, the rub rail 500 and the side rail 400 are formed with extruded aluminum.

In the illustrated implementation of FIG. 7, the side rail 400 is generally C-shaped and includes a top horizontal face 420, a side vertical face 410, and a bottom horizontal face 430. The top horizontal face 420 includes a hook 432 for attaching cargo securement devices and a downward step 450 for providing a surface to attach floor boards to the side rail 400. A notch 431 in the downward step 450 provides a mark for the location of the fasteners used to attach the floor boards to the side rail 400. The bottom horizontal face 430 includes double hooks 433, 434 for use by sliding winches and notches 431, 432 to mark the location of fasteners joining the cross members to the side rail.

In the illustrated implementation of FIG. 7, the rub rail 500 is generally C-shaped and includes a top horizontal face 530, a side vertical face 510, and a bottom horizontal face 520. The top horizontal face 530 is coupled to the side vertical face 510 by a top chamfer 540. The bottom horizontal face 520 is coupled to the side vertical face 510 by a bottom chamfer 550. Accordingly, in the illustrated implementation of FIG. 7, the rub rail 500 includes five sides, which provide physical strength and damage-resistant characteristic.

In the illustrated implementation of FIG. 7, holes 541, 551 are cut in the top and bottom chamfers 540, 550, along the length of the rub rail 500. The holes 541, 551 provide locations to attach cargo restraint devices such as hooks, chains, straps, and posts. The top holes 541 are substantially aligned with the bottom holes 551. In one implementation, the top holes 541 start at the approximate center of the surface of the top chamfer 540 and run through the edge of the top horizontal face 530 of the rub rail 500. In one implementation, the bottom holes 551 start at the approximate center of the surface of the bottom chamfer 550 and run through the edge of the bottom horizontal face 520 of the rub rail 500. Starting the cut of the holes 541, 551 approximately half way through the top and bottom chamfers 540, 550 is important for maintaining the strength of the rub rail 500 by increasing the area moment of inertia of the vertical 510, top 530, and bottom 520 faces of the rub rail 500 in more directions. This increases the stiffness and strength of the design from impacts from the side, as well as from above and below.

Figure 8:
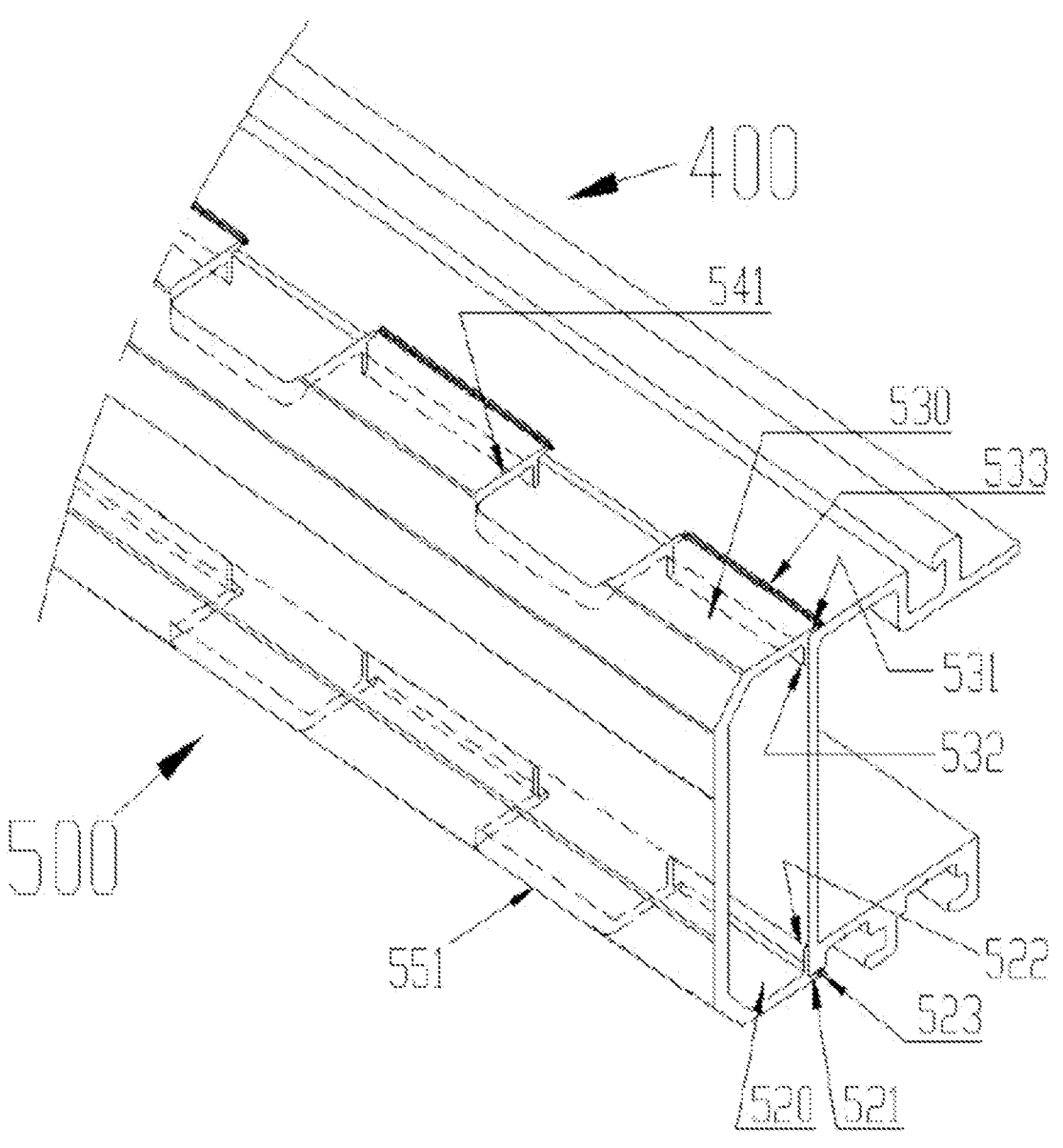
FIG. 8 is a top perspective view of the rub rail coupled to the side rail in accordance with the further implementation of the present disclosure.

FIG. 8 is a top perspective view of the rub rail 500 coupled to the side rail 400 in accordance with the further implementation of the present disclosure. In the illustrated implementation of FIG. 8, the rails 500, 400 are configured in two separate pieces without requiring the rails to slide together from the side, as shown in FIGS. 4 through 6.

In the illustrated implementation of FIG. 8, the rub rail 500 is configured to couple to the side rail 400 using a pair of walls (vertical wall 532 and horizontal wall 531) attached to the top horizontal face 530, and another pair of walls (vertical wall 522 and horizontal wall 521) attached to the bottom horizontal face 520 of the rub rail 500. The rub rail 500 is then coupled to the side rail 400 by welding and/or soldering.

Figure 9:
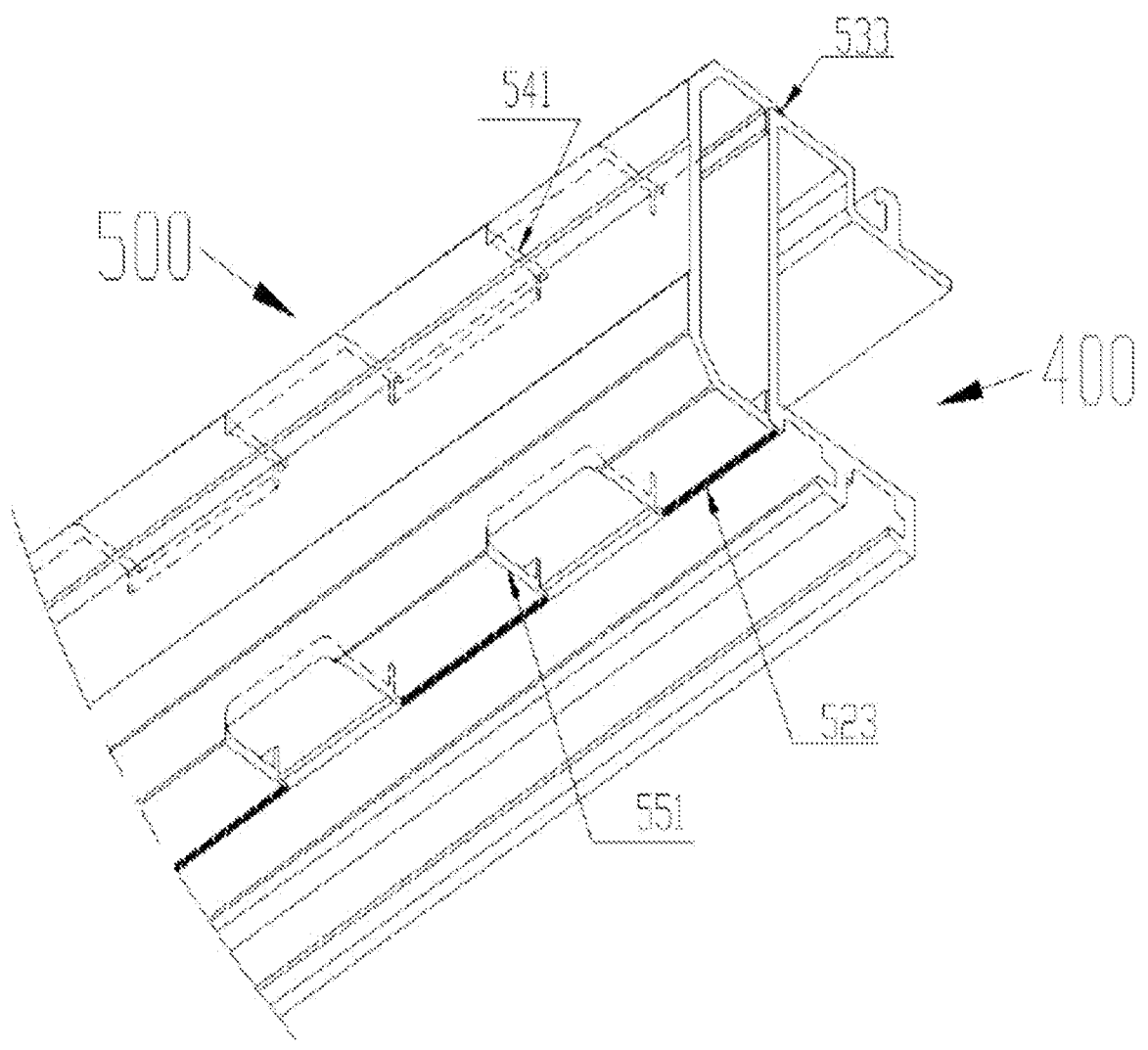
FIG. 9 is a bottom perspective view of the rub rail coupled to the side rail in accordance with the further implementation of the present disclosure.

FIG. 9 is a bottom perspective view of the rub rail 500 coupled to the side rail 400 in accordance with the further implementation of the present disclosure. FIG. 9 also shows the holes 541, 551.

Figure 10:
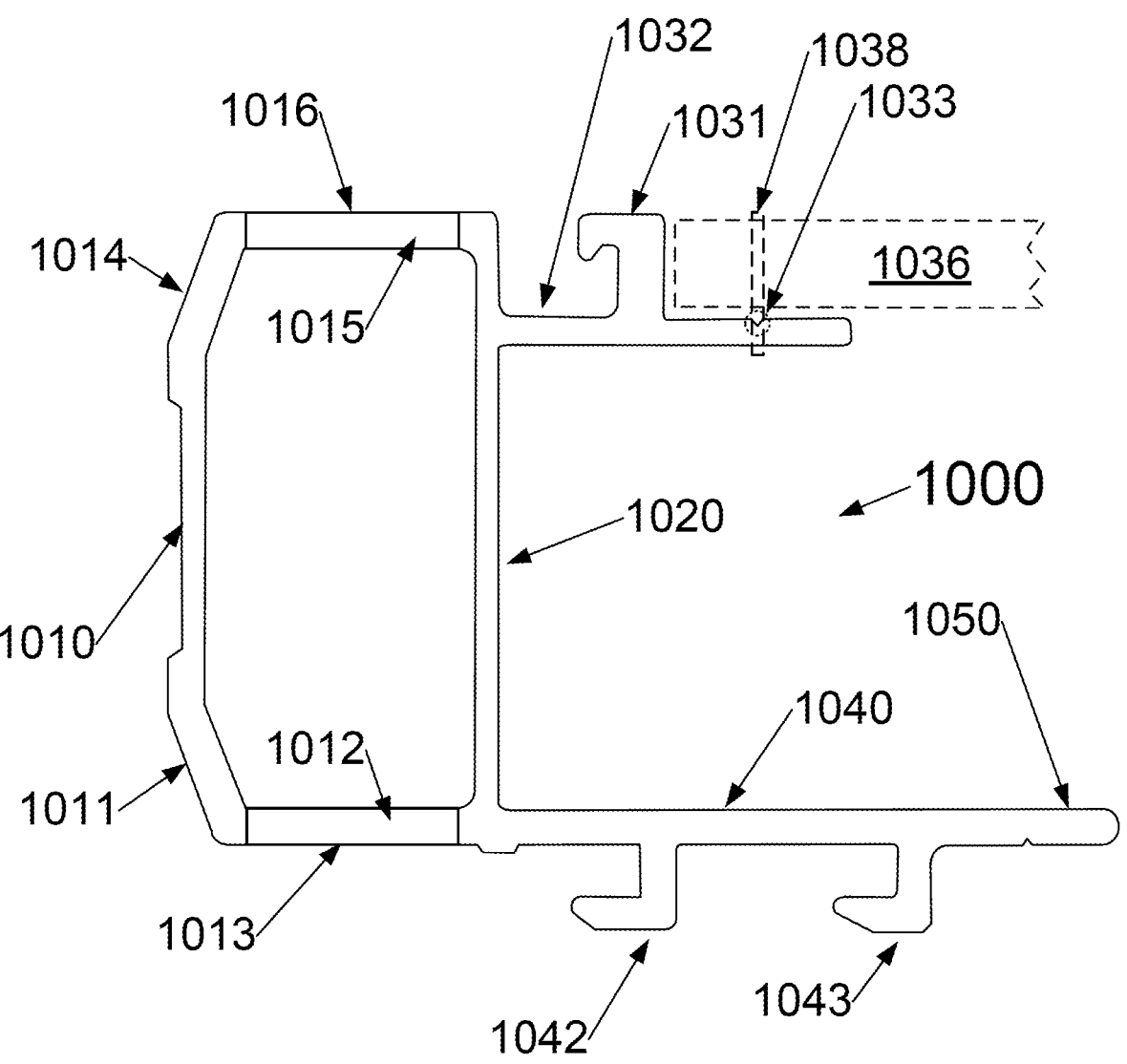
FIG. 10 is a side view a side rail assembly in accordance with another implementation of the present disclosure.

FIG. 10 is a side view a side rail assembly 1000 (including a rub rail 1060) in accordance with another implementation of the present disclosure. The side rail assembly 1000 runs the entire side of the trailer from front to rear. In illustrated implementation of FIG. 10, the side rail assembly 1000 including the rub rail 1060 is extruded as one integrated piece. In one implementation, the one integrated piece is formed with extruded aluminum.

In the illustrated implementation of FIG. 10, the side rail assembly 1000 includes a top horizontal face 1016, a top extension face 1032, a side vertical face 1010, a bottom horizontal face 1013, an inner vertical face 1020, and a bottom extension face 1040. The top horizontal face 1016 is diagonally coupled to the side vertical face 1010 by a top chamfer 1014. The top horizontal face 1016 also steps down into the top extension face 1032, which extends to provide a surface to attach floor boards 1036 to the side rail assembly 1000 using fasteners 1038. The bottom horizontal face 1013 is diagonally coupled to the side vertical face 1010 by a bottom chamfer 1011. The bottom horizontal face 1013 also couples to the bottom extension face 1040, which further extends to an extended flange 1050 to provide an ability to use flat hooks as an additional option for cargo securement (e.g., see FIG. 13).

Accordingly, in the illustrated implementation of FIG. 10, the side rail assembly 1000 includes six sides 1016, 1014, 1010, 1011, 1013, 1020, which provide physical strength and damage-resistant characteristic. The side rail assembly 1000 also extends into two extension faces 1032, 1040.

Figure 11:
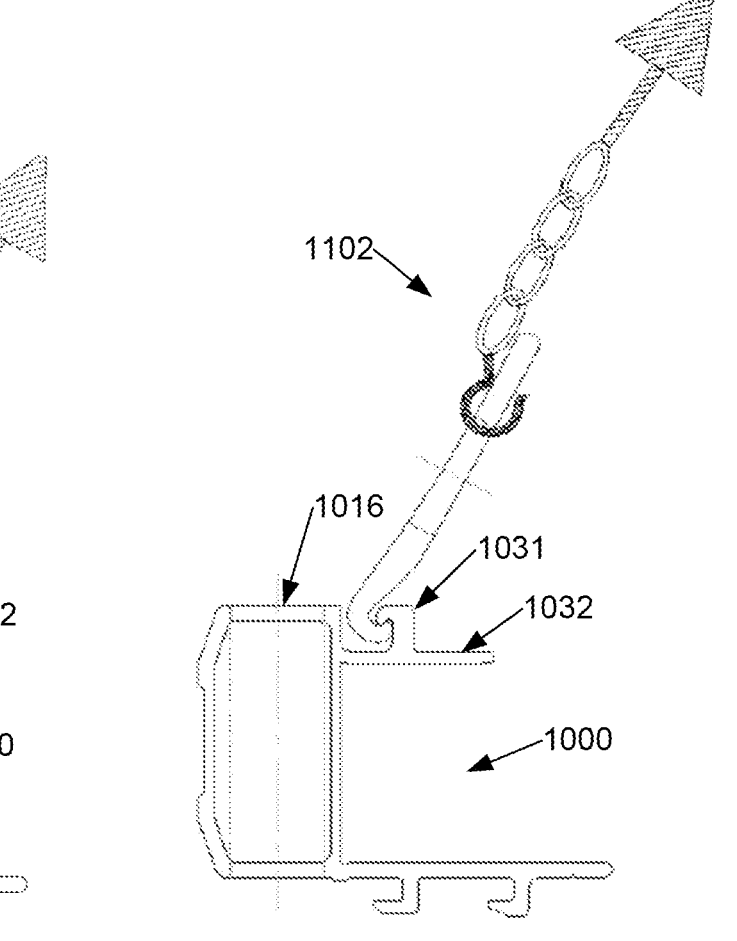
FIGS. 11A and 11B show side views of cargo securement devices attached to the hook on the top extension face in accordance with one implementation of the present disclosure.

In the illustrated implementation of FIG. 10, the top extension face 1032 includes a hook 1031 for attaching cargo securement devices (e.g., see FIG. 11A and FIG. 11B). A notch 1033 in the top extension face 1032 provides a mark for the location of the fasteners 1038 used to attach the floor boards 1036 to the side rail assembly 1000. In the illustrated implementation of FIG. 10, the bottom extension face 1040 includes double hooks 1042, 1043 for use by sliding winches (e.g., see FIG. 12).

In the illustrated implementation of FIG. 10, slot holes 1015, 1012 are cut in the top and bottom horizontal faces 1016, 1013 (rather than the top and bottom chamfers 1014, 1011 for ease of manufacture). The slot holes 1015, 1012 provide locations to attach cargo restraint devices such as hooks, chains, straps, and posts (e.g., see FIG. 12). The top slot holes 1015 are substantially aligned with the bottom slot holes 1012.

FIGS. 11A and 11B show side views of cargo securement devices 1100, 1102 attached to the hook 1031 on the top extension face 1032 in accordance with one implementation of the present disclosure. In FIG. 11A, the cargo securement device 1100 is a J-hook anchor. In FIG. 11B, the cargo securement device 1100 is a J-hook anchor with chain 1102.

Figure 12:
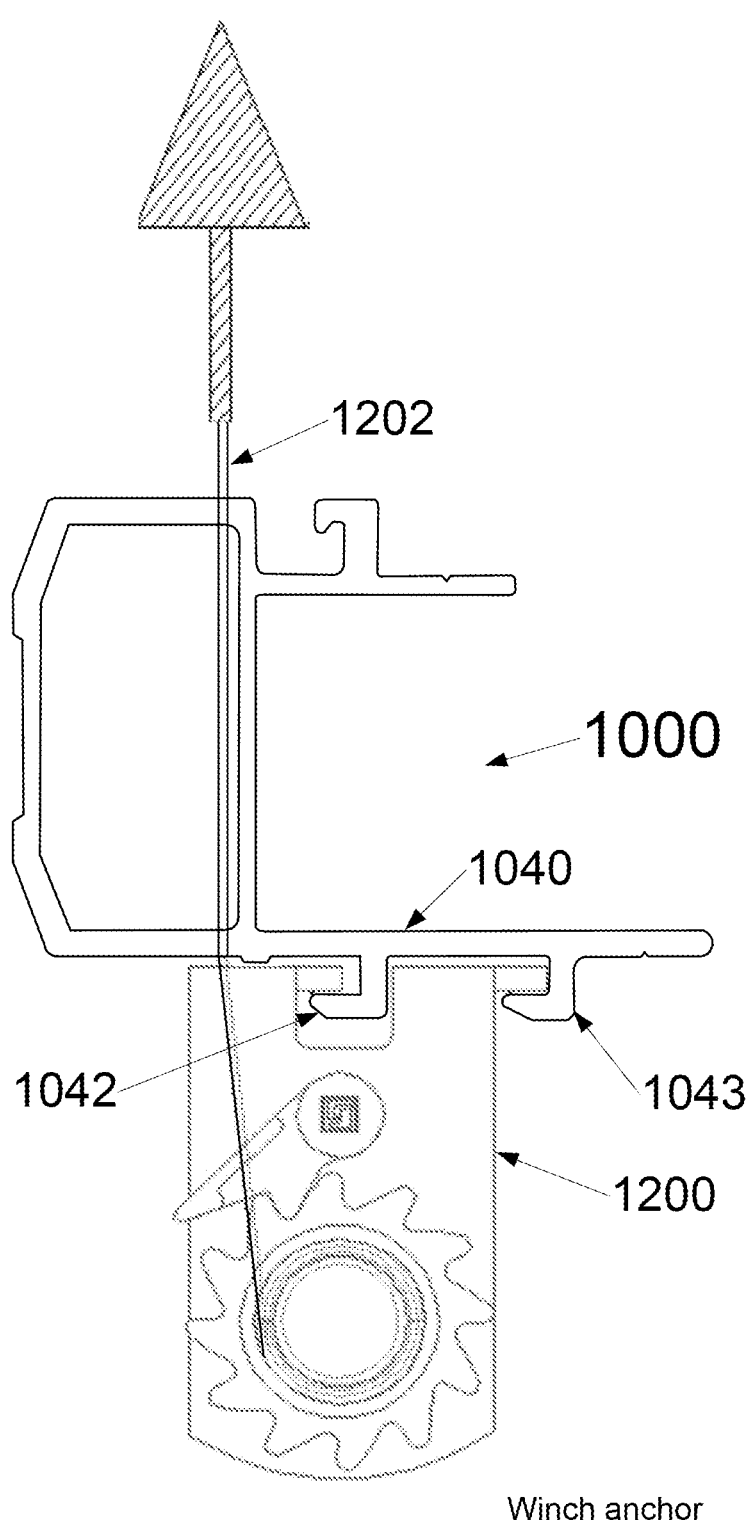
FIG. 12 is a side views of a cargo securement device attached to the double hooks on the bottom extension face in accordance with another implementation of the present disclosure.

FIG. 12 is a side views of a cargo securement device 1200 attached to the double hooks 1042, 1043 on the bottom extension face 1040 in accordance with another implementation of the present disclosure. In the illustrated implementation of FIG. 12, the cargo securement device 1200 includes sliding winches, ropes, straps, posts, chains, and other similar restraint devices. The cargo securement device 1200 also include chains and anchors 1202.

Figure 13:
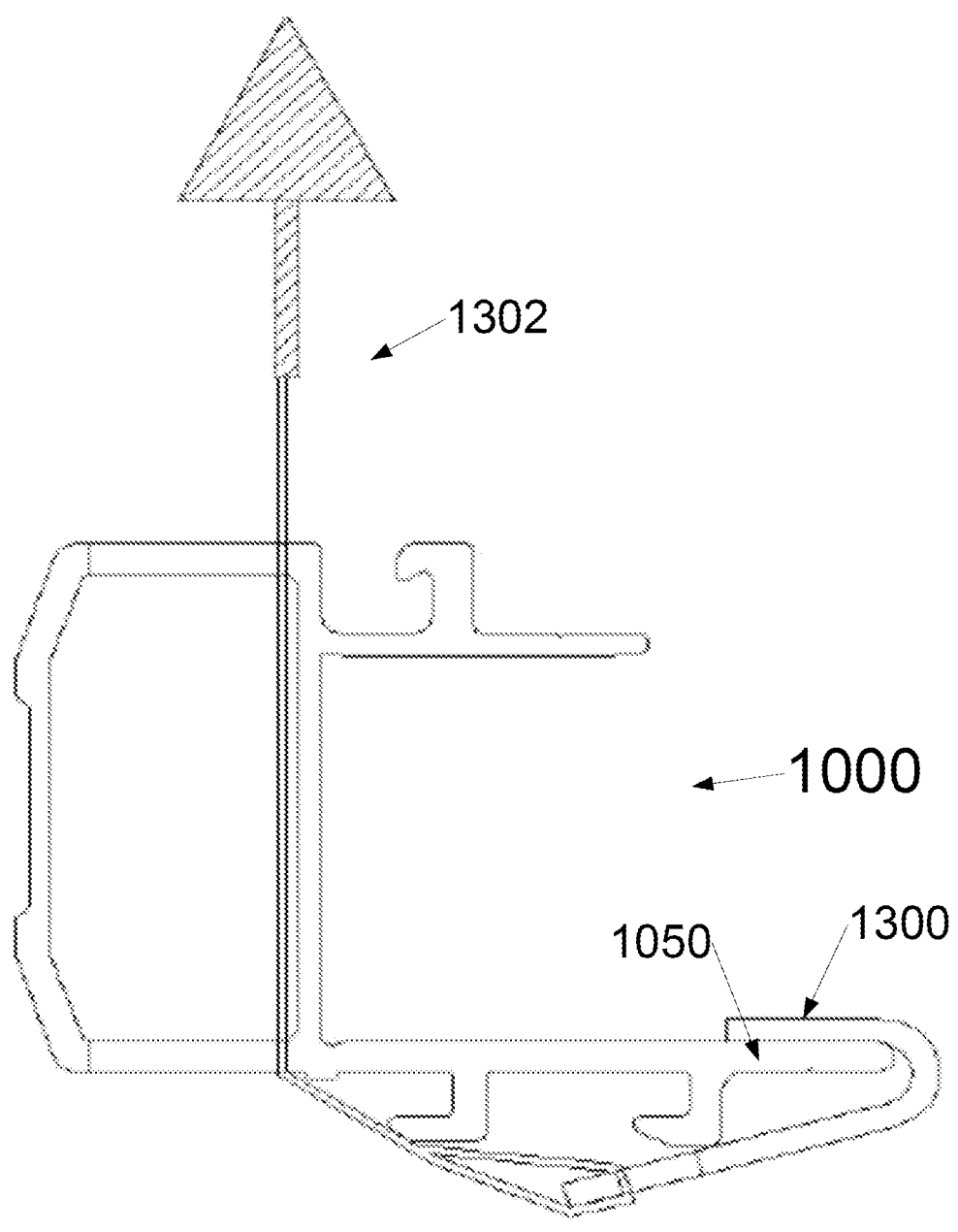
FIG. 13 is a side view of a cargo securement device attached to the extended flange coupled to the bottom extension face in accordance with another implementation of the present disclosure.

FIG. 13 is a side view of a cargo securement device 1300 attached to the extended flange 1050 coupled to the bottom extension face 1040 in accordance with another implementation of the present disclosure. In the illustrated implementation of FIG. 13, the cargo securement device 1300 a flat hook anchor, ropes, straps, posts, chains, and other similar restraint devices. The cargo securement device 1300 also include chains and anchors 1302.

In summary, the following implementations are disclosed. In one implementation, a side rail assembly for a flatbed trailer extruded together as one integrated piece is disclosed. The side rail assembly includes: a top extension face; a top chamfer; a side vertical face; a top horizontal face diagonally coupled to the side vertical face by the top chamfer, the top horizontal face to step down into the top extension face, wherein the top extension face extends to provide a surface to attach floor boards to the side rail assembly; an inner vertical face; a bottom extension face; an extended flange coupled to the bottom extension face; a bottom chamfer; and a bottom horizontal face diagonally coupled to the side vertical face by the bottom chamfer, the bottom horizontal face also couples to the bottom extension face, wherein the bottom horizontal face extends to the extended flange to provide an ability to use flat hooks for cargo securement.

In one implementation, the top extension face includes a top hook for attaching cargo securement devices to the side rail assembly. In one implementation, the side rail assembly further includes a notch in the top extension face to provide a mark for the location of the fasteners 1038 used to attach the floor boards 1036 to the side rail assembly. In one implementation, the bottom extension face includes two hooks for attaching cargo securement devices to the side rail assembly. In one implementation, the side rail assembly further includes a plurality of slot holes cut in the top horizontal face and the bottom horizontal face. In one implementation, the plurality of slot holes includes top slot holes and bottom slot holes. In one implementation, the top slot holes are substantially aligned with the bottom slot holes. In one implementation, the side rail assembly is formed with extruded aluminum.

The above description of the disclosed implementations is provided to enable any person skilled in the art to make or use the invention as described in the specification presented above. Various modifications to these implementations will be readily apparent to those skilled in the art, and the generic principles described herein can be applied to other implementations without departing from the spirit or scope of the disclosure. Accordingly, the techniques are not limited to the specific examples described above. Thus, it is to be understood that the description and drawings presented herein represent a presently possible implementation of the disclosure and are therefore representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A side rail assembly for a flatbed trailer extruded together as one integrated piece, the side rail assembly comprising:
   a top extension face; a top chamfer;
   a side vertical face;
   a top horizontal face diagonally coupled to the side vertical face by the top chamfer, the top horizontal face to step down into the top extension face, wherein the top extension face extends to provide a surface to attach floor boards to the side rail assembly;
   an inner vertical face; a bottom extension face;
   an extended flange coupled to the bottom extension face;
   a bottom chamfer; and
   a bottom horizontal face diagonally coupled to the side vertical face by the bottom chamfer, the bottom horizontal face also couples to the bottom extension face,
   wherein the bottom horizontal face extends to the extended flange to provide an ability to use flat hooks for cargo securement.

2. The side rail assembly of claim 1, wherein the top extension face includes a top hook for attaching cargo securement devices to the side rail assembly.

3. The side rail assembly of claim 1, further comprising a notch in the top extension face to provide a mark for a location of one or more fasteners used to attach the floor boards to the side rail assembly.

4. The side rail assembly of claim 1, wherein the bottom extension face includes two hooks for attaching cargo securement devices to the side rail assembly.

5. The side rail assembly of claim 1, further comprising a plurality of slot holes cut in the top horizontal face and the bottom horizontal face.

6. The side rail assembly of claim 5, wherein the plurality of slot holes includes top slot holes and bottom slot holes.

7. The side rail assembly of claim 6, wherein the top slot holes are substantially aligned with the bottom slot holes.

8. The side rail assembly of claim 1, wherein the side rail assembly is formed with extruded aluminum.

* * * * *